(12) United States Patent
Day et al.

(10) Patent No.: US 12,067,077 B2
(45) Date of Patent: Aug. 20, 2024

(54) VEHICLE DETECTION AND IDENTIFICATION THROUGH AUDIO PROPAGATION

(71) Applicant: GM Global Technology Operations LLC, Detroit, MI (US)

(72) Inventors: Brian A. Day, Birmingham, MI (US); Adam Gary Lange, Superior Township, MI (US); Jeremy Lentner, Troy, MI (US); Rafael Tiles, Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 443 days.

(21) Appl. No.: 17/523,370

(22) Filed: Nov. 10, 2021

(65) Prior Publication Data

US 2023/0146051 A1 May 11, 2023

(51) Int. Cl.
*G06K 9/00* (2022.01)
*G06F 18/21* (2023.01)
*G06F 18/22* (2023.01)
*G06T 7/90* (2017.01)

(52) U.S. Cl.
CPC .............. *G06F 18/21* (2023.01); *G06F 18/22* (2023.01); *G06T 7/90* (2017.01); *G06V 2201/08* (2022.01); *G10H 2210/571* (2013.01)

(58) Field of Classification Search
CPC .......... G06F 18/21; G06F 18/22; G06T 7/90; G06V 2201/08; G06V 10/761; G06V 10/82; G10H 2210/571; G10L 19/018; H04B 11/00; A63F 13/54; A63F 13/803; A63F 2300/6072; G01S 1/72; G01S 11/14

See application file for complete search history.

(56) References Cited

U.S. PATENT DOCUMENTS

| | | | |
|---|---|---|---|
| 10,414,336 B1 * | 9/2019 | Harper | B60Q 5/008 |
| 10,433,083 B2 * | 10/2019 | Moriguchi | H04B 11/00 |
| 2021/0256839 A1 * | 8/2021 | Zavesky | G08G 1/0133 |

* cited by examiner

*Primary Examiner* — Duy M Dang
(74) *Attorney, Agent, or Firm* — Vivacqua Crane, PLLC

(57) ABSTRACT

A method of motor vehicle detection and identification through audio propagation includes generating source autometric signatures; broadcasting autometric signatures; detecting the autometric signatures; visualizing the autometric signatures; determining known autometric signatures; and evaluating and sending autometric signatures to the motor vehicle.

17 Claims, 4 Drawing Sheets

| T1 | T2 | T3 | T4 | T5 | T6 | T7 | T8 | T9 | T10 | T11 | T12 | T13 | T14 | T15 | T16 | T17 | T18 | T19 | T20 | T21 |
|---|---|---|---|---|---|---|---|---|---|---|---|---|---|---|---|---|---|---|---|---|
| SYNC CHORD | SYNC SILENCE | GAMER ID CHORD | SILENCE | VEH TYPE CHORD | SILENCE | TRIM LEVEL CHORD | SILENCE | GAMER ID CHORD | SILENCE | VEH TYPE CHORD | SILENCE | TRIM LEVEL CHORD | SILENCE | GAMER ID CHORD | SILENCE | VEH TYPE CHORD | SILENCE | TRIM LEVEL CHORD | END SILENCE | END CHORD |

FIG. 4

| OBJECT | NUMBER OF TONES IN CHORD | DURATION DERIVED FROM... |
|---|---|---|
| SYNC CHORD | 2 | PRE-DETERMINED VALUE |
| SYNC SILENCE | 0 | PRE-DETERMINED VALUE |
| CORVETTE1 | 9 | CHARACTER C DURATION VALUE |
| SILENCE | 0 | CHARACTER O DURATION VALUE |
| CORVETTE1 | 9 | CHARACTER R DURATION VALUE |
| SILENCE | 0 | CHARACTER V DURATION VALUE |
| CORVETTE1 | 9 | CHARACTER E DURATION VALUE |
| SILENCE | 0 | CHARACTER T DURATION VALUE |
| CORVETTE1 | 9 | CHARACTER T DURATION VALUE |
| SILENCE | 0 | CHARACTER E DURATION VALUE |
| CORVETTE1 | 9 | CHARACTER 1 DURATION VALUE |
| END SILENCE | 0 | PRE-DETERMINED VALUE |
| END CHORD | 2 | PRE-DETERMINED VALUE |

FIG. 5

VEHICLE DETECTION AND IDENTIFICATION THROUGH AUDIO PROPAGATION

INTRODUCTION

The present disclosure relates to vehicle detection and identification. More specifically, the present disclosure relates to vehicle detection and identification through audio propagation.

As motor vehicles become more automated and the interface between a user and the vehicle increases, vehicles are increasingly expanding their roles beyond passenger transportation. For example, an auditory signaling mechanism emitted by the vehicle has the capability to transmit information during an emergency situation, as well as becoming an enabler of an interactive real-world gaming application.

While current vehicle identification systems achieve their intended purpose, there is a need for a new and improved system and method for vehicle detection and identification.

SUMMARY

According to several aspects, a method of motor vehicle detection and identification through audio propagation includes generating source autometric signatures; broadcasting autometric signatures; detecting the autometric signatures; visualizing the autometric signatures; determining known autometric signatures; and evaluating and sending autometric signatures to the motor vehicle.

In an additional aspect of the present disclosure, the method further includes determining the source of the autometric signature data.

In another aspect of the present disclosure, the motor vehicle communicates with an information exchange infrastructure.

In another aspect of the present disclosure, the method further includes detecting image similarities of the signatures with deep learning image comparison.

In another aspect of the present disclosure, the method further includes listening for autometric signals with a mobile device.

In another aspect of the present disclosure, the mobile device communicates with the information exchange infrastructure.

In another aspect of the present disclosure, generating autometric signatures includes character to frequency mapping.

In another aspect of the present disclosure generating autometric signatures includes character to temporal mapping.

In another aspect of the present disclosure, generating autometric signatures includes character to color mapping.

In another aspect of the present disclosure, visualizing the autometric signatures includes audio signature analysis and signal data visualization.

In another aspect of the present disclosure, the method further includes storing data associated with the autometric signatures in a source repository.

According to several aspects, a method of motor vehicle detection and identification through audio propagation includes generating source autometric signatures, including character to frequency mapping, character to temporal mapping, and character to color mapping; broadcasting autometric signatures and detecting the autometric signatures with a device; visualizing the autometric signatures, including audio signature analysis and signal data visualization; determining known autometric signatures; and evaluating and sending autometric signatures to the motor vehicle.

In another aspect of the present disclosure, the method further includes determining the source of the autometric signature data.

In another aspect of the present disclosure, the motor vehicle communicates with an information exchange infrastructure.

In another aspect of the present disclosure, the method further includes detecting image similarities of the signatures with deep learning image comparison.

In another aspect of the present disclosure, the method further includes listening for autometric signals with a mobile device.

In another aspect of the present disclosure, the mobile device communicates with the information exchange infrastructure.

In another aspect of the present disclosure, the method further includes storing data associated with the autometric signatures in a source repository.

According to several aspects, a method of motor vehicle detection and identification through audio propagation includes generating source autometric signatures, including character to frequency mapping, character to temporal mapping, and character to color mapping; visualizing the autometric signatures, including audio signature analysis and signal data visualization; determining known autometric signatures; detecting image similarities of the signatures with deep learning image comparison; and sending autometric signature to the motor vehicle. The motor vehicle communicates with an information exchange infrastructure and a mobile device listens to the autometric signals and communicates with the information exchange infrastructure.

In another aspect of the present disclosure, the method further comprises evaluating a sequence of chords to determine a distinct audio signature.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 4 and 5 are drawings of data encoded rhythm audio tones produced with the system shown in FIG. 1 according to an exemplary embodiment.

DETAILED DESCRIPTION

The following description is merely exemplary in nature and is not intended to limit the present disclosure, application, or uses.

Figure 1:
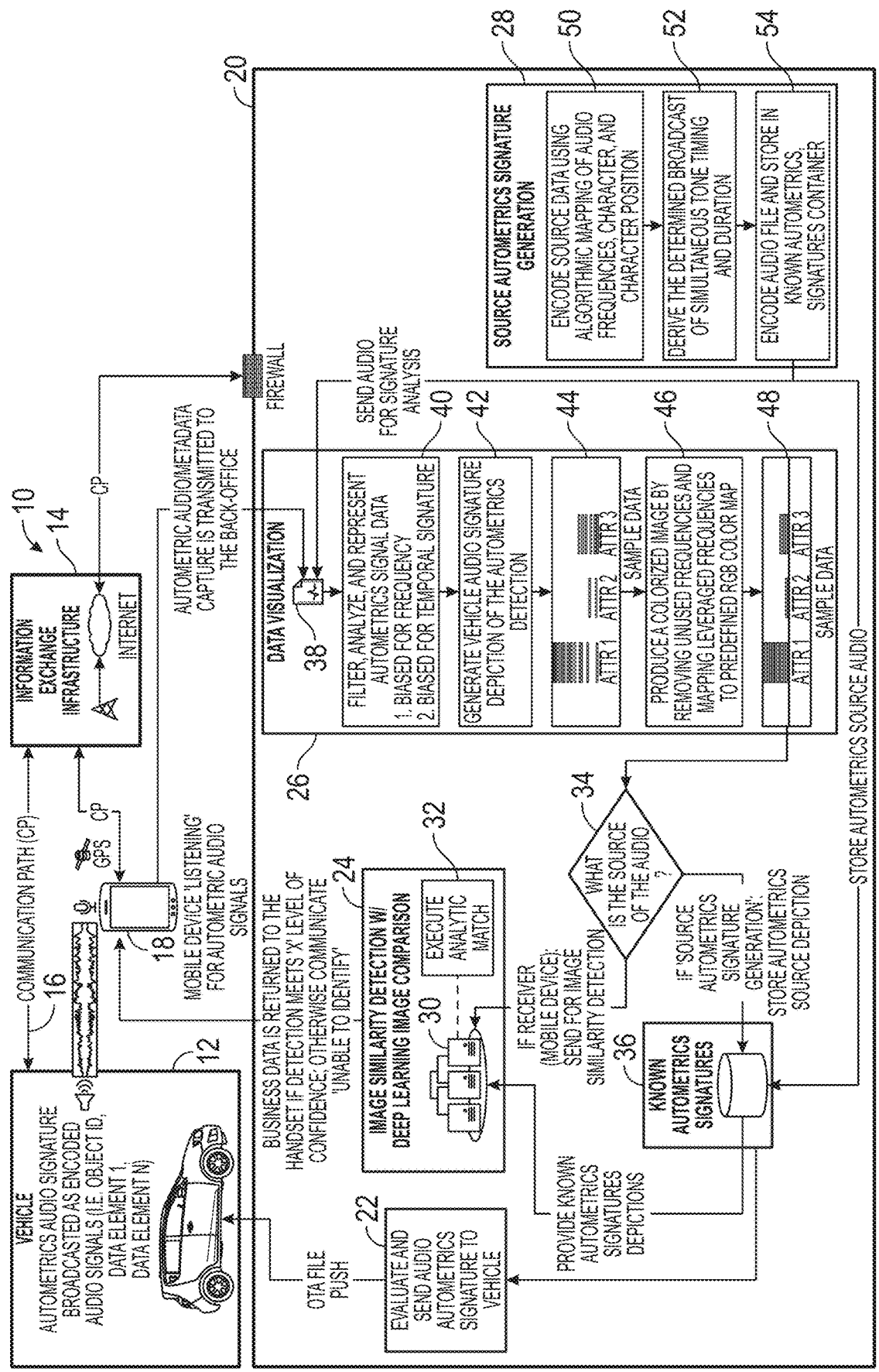
FIG. 1 is a block diagram of a system for vehicle detection and identification according to an exemplary embodiment.

Referring to FIG. 1, there is shown a system 10 that enables a vehicle 12 to transmit a uniquely identifiable audio signal 16 to communicate data as a gamification enabler or in situations where the vehicle 12 is not easily within reach. A detection apparatus, such as, for example, a mobile device 18 leverages the microphone capability of the mobile device 18 to listen and communicate with a back-office.

The back-office 20 provides an analytic process for audio autometrics. The back-office 20 includes a source autometrics signature generation module 28, a data visualization module 26, a storage module 36, an image similarity detection module 24, and an evaluation and send module 22. The mobile device 18 communicates directly with the back-office 20, as well as with the vehicle 12 and the back-office 20 through an information exchange infrastructure 14.

The autometrics signature generation module 28 includes a set of sub-modules 50, 52 and 54. The sub-module 50 encodes source data employing algorithmic mapping of audio frequencies, character and character position; the sub-module 52 determines the simultaneous tone timing and duration; and the sub-module 54 encodes an audio file and stores it in a known autometrics signature container. Information from the autometrics signature generation module 28 is transmitted to the data visualization module 26 and the storage module 36.

Figure 2:
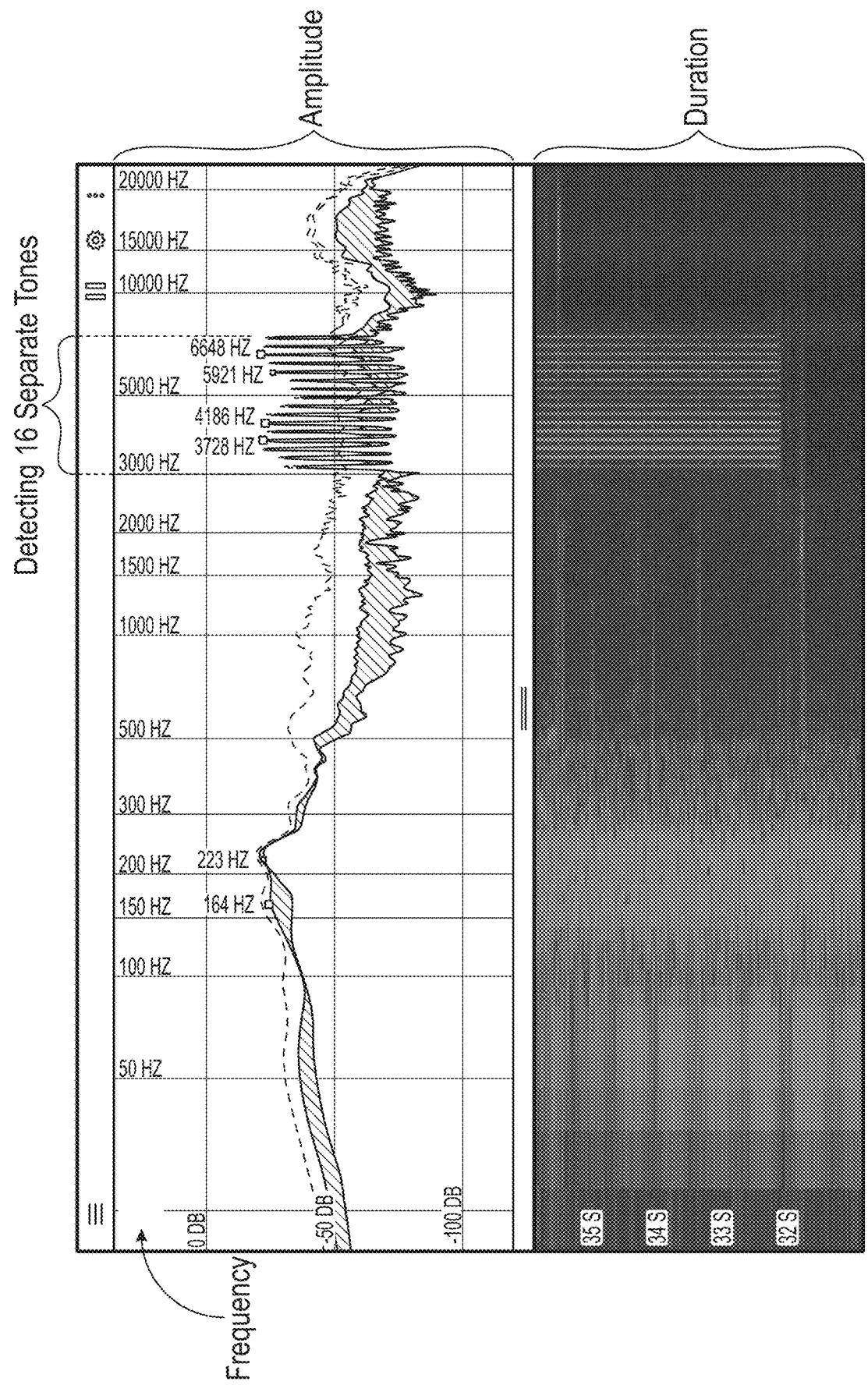
FIG. 2 is an image of an autometrics viability test with the system shown in FIG. 1 according to an exemplary embodiment.

The data visualization module 26 includes a set of sub-modules 40, 42 and 46. The sub-module 40 filters, analyzes and represents autometrics signal data that is biased for frequency and biased for temporal signatures; the sub-module 42 generates vehicle audio signature depiction of the autometrics as sample data 44; and with the sample data 44, the sub-module 46 produces a colorized image 48 by removing unused frequencies and mapping the leveraged frequencies to a predefined RGB color map. FIG. 2 illustrates the amplitude and duration of the detection of 16 separate tones. Further details of the analytic process associated with the back-office 20 are described below.

Figure 3:
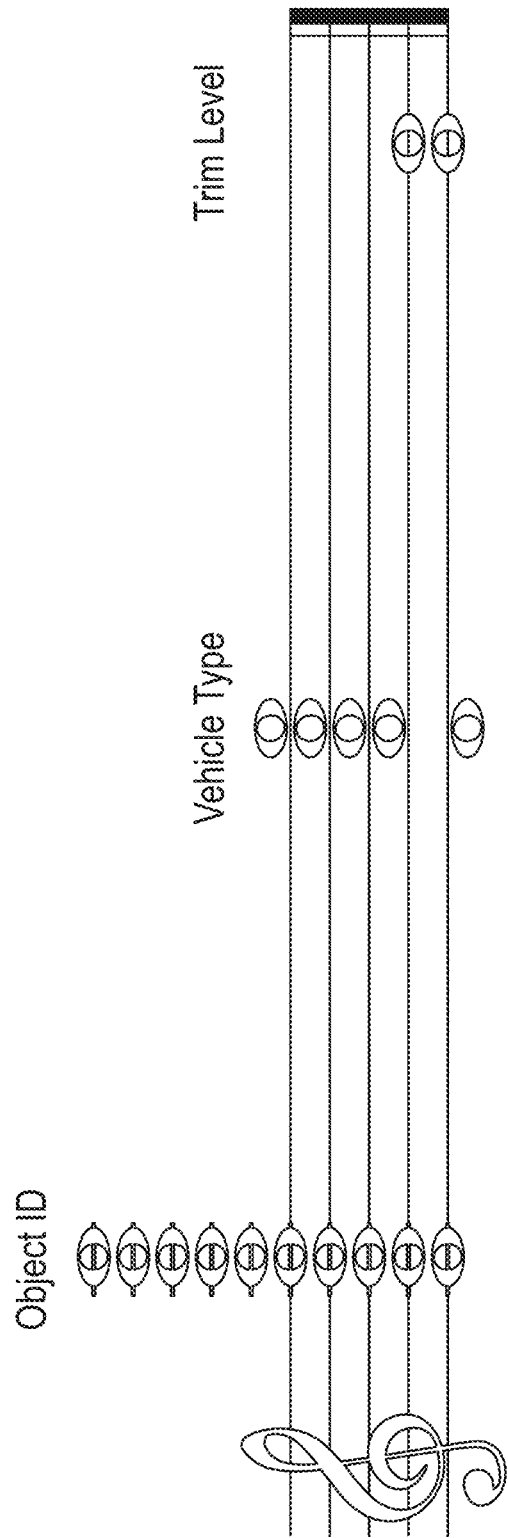
FIG. 3 is a drawing of data encoded frequency audio tones produced with the system shown in FIG. 1 according to an exemplary embodiment.

The system 10 encodes and stores vehicle, gamer and exclusive attributes (metadata) leveraging a combination of audio and color to create a vehicle/object specific audio signature message and corresponding encoded message image representation. The system 10 creates the equivalent of a musical chord (simultaneously played tones) for each piece of data utilizing a selected frequency range, as shown in FIG. 3. Each chord provides an object ID of a vehicle, the type of the vehicle, and the trim level of the vehicle.

The execution of chords in sequence is enhanced by purposeful pauses (silences) between chord broadcasts. These pauses are applied in a chord-silence alternating sequence. This sequence establishes a rhythm (chord and silence durations, as shown in FIG. 4). Rhythm is applied utilizing a mathematic function. For example, given an initial duration minimum value of x (in milliseconds), a duration separation value of y (in milliseconds), and a character position z (position of the character in the character set), the expression d (duration)=x+(y*z)−y. The unique (vehicle or object specific) sequence of chords and silences is also represented as a synesthetic-like image depiction that conveys the frequency and temporal aspects of the encoded message. Hence, the autometric is the unique combination of frequency chords and associated rhythm utilized to convey data.

Referring back to FIG. 1, the source autometric signature generation module 28 provides character to frequency mapping, and character to temporal mapping. For character to frequency mapping, the first and last chords in each transmission are pre-defined sets of sync tones outside the range of the character mapping. Content strings are encoded into chords, giving each a distinct audio signature within a defined character set. Each character of a content string is represented by a frequency value (Hz) employing the following expression: Hz=(hz_minimum+((position_in_string*character_set_length*hz_delta)+((character_number+1)*hz_delta))−hz_delta).

For character to temporal mapping, the duration of each chord and the intervening silences are derived with the expression: ms=ms_minimum+(position*ms_delta)−ms_delta. And for character to color mapping, a hue, saturation, and luminosity (HSL) color value is assigned to each character based on the character and its position in its parent content string. Data 38 from the source autometrics signature generation module 28 is transmitted to the data visualization module 26. Data from the source autometric signature generation module 28 is also transmitted to the storage module 36 as known autometric signatures.

The data visualization module 26 encodes the data 38. Specifically, the data visualization module 26 provides audio signature analysis and signal visualization, starting with an audio file 38. The signal data visualization provides a spectrogram image, which is the data processed to generate black and white spectrogram image representing the complete time domain and frequency domain, and colorized image depiction, which is data that is processed to generate a compressed, colorized image.

Data from the data visualization module 26 is transmitted to a decision module 34, which determines the source of the audio data. If the source is from the autometrics signature generation module 28, the data from the data visualization module is transmitted to the storage module 36. Vehicle signature messages, vehicle attributes, vehicle black and white spectrogram and vehicle colorized spectrogram are sent to a distributed data mining repository. Image files and audio files are distributed (shared) across the data mining repository with capability to increase the footprint to reduce data density per physical resource as data volume increases.

Next the audio file is sent to the evaluation and send module 22. Here, audio signature messages are sent as over-the-air (OTA) file push to the vehicle audio internal module for broadcast. Further, sound broadcast conditions are enabled via vehicle internal module triggers. For example, business use cases may require interaction from the vehicle operator to be enabled. As such, the vehicle 12 plays the audio signature message leveraging the infotainment or external speaker systems.

Next, the mobile device 18 provides detection and interaction with the cloud. Through the mobile device 18, indicators are sent to the user to confirm that the microphone is active and is recording and to initiate audio recording. Feedback to the user is provided for both successful detection and failed engagements (via SMS/MMS/Push) by a two-factor interaction model.

Further, the mobile device 18 sends information OTA to the back office 20, in particular, the data visualization module 26. In various arrangements, this information can contain encapsulated applicable metadata and audio files, including, such as, for example, gamification sending account, gamification destination account, emergency sending account, and emergency destination account.

If the decision module 34 determines that the source of the data from the data visualization module 26 originated from the mobile device 18, the data is transmitted to the image similarity detection module 24 with deep learning image comparison of a set of images 30 to execute an analytic match 32.

The module 24 analyzes RGB content of receiver compressed colorized images to identify the sync chord and end chord to align the message start and end points. The module 24 also makes a pixel-by-pixel comparison against the compressed colorized images in the storage module 36. The output of the module 24 is a pixel match distribution percentage, and the match success is based on a tolerance criteria.

As stated above, the module 24 also provides high level AI deep learning. Accordingly, the data set and known outcomes are utilized to generate a decision model that is applied to fresh data to make judgements. Dependent applications also utilize the model to increase execution confidence. When new data is available, the model is re-trained and improved and the model is applied to fresh data to make judgements. In addition, the module 24 performs a population comparison size reduction utilizing image analysis. Hence, feature extraction is utilized to qualify an image as a member of a sub-population for deep learning comparisons. Sub-population approximations are performed by the deep learning system to identify confidence math level tolerances to address potential uncertainty derived from the broadcast attributes. Information is transmitted (SMS/MMS/Push) back to the mobile device 18 that an image match is found. Information may also be transmitted to other business systems, such as, for example, web service API.

The system 10 provides one or more of the following benefits: enables gaming activities played in an extensive outdoor area involving the collection of vehicle broadcasts to receive interactive feedback powered by a mobile application detection mechanism; provide communication of a vehicle's metadata; provides an available detection apparatus with an application that leverages the microphone capability to listen and send captured audio and receive decoded signature messages and metadata; and provides an approach to detect broadcast metadata by law enforcement vehicles following a suspect vehicle within a physical distance range or emergency first responders identifying vehicles in distress.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of motor vehicle detection and identification through audio propagation, the method comprising:
    generating source autometric signatures;
    broadcasting the autometric signatures;
    detecting the autometric signatures;
    visualizing the autometric signatures;
    determining known autometric signatures;
    evaluating and sending autometric signatures to the motor vehicle; and
    detecting image similarities of the autometric signatures with deep learning image comparison.

2. The method of claim 1 further comprising determining a source of the autometric signature data.

3. The method of claim 1, wherein the motor vehicle communicates with an information exchange infrastructure.

4. The method of claim 1 further comprising listening for autometric signals with a mobile device.

5. The method of claim 4, wherein the mobile device communicates with the information exchange infrastructure.

6. The method of claim 1, wherein generating autometric signatures includes character to frequency mapping.

7. The method of claim 1, wherein generating autometric signatures includes character to temporal mapping.

8. The method of claim 1, wherein generating autometric signatures includes character to color mapping.

9. The method of claim 1, wherein visualizing the autometric signatures includes audio signature analysis and signal data visualization.

10. The method of claim 1 further comprising storing data associated with the autometric signatures in a source repository.

11. A method of motor vehicle detection and identification through audio propagation, the method comprising:
    generating source autometric signatures, including character to frequency mapping, character to temporal mapping, and character to color mapping;
    broadcasting autometric signatures and detecting the autometric signatures with a device;
    visualizing the autometric signatures, including audio signature analysis and signal data visualization;
    determining known autometric signatures;
    evaluating and sending autometric signatures to the motor vehicle; and
    detecting image similarities of the autometric signatures with deep learning image comparison.

12. The method of claim 11 further comprising determining the source of the autometric signature data.

13. The method of claim 11, wherein the motor vehicle communicates with an information exchange infrastructure.

14. The method of claim 13 further comprising listening for autometric signals with a mobile device.

15. The method of claim 14, wherein the mobile device communicates with the information exchange infrastructure.

16. The method of claim 11 further comprising storing data associated with the autometric signatures in a source repository.

17. A method of motor vehicle detection and identification through audio propagation, the method comprising:
    generating source autometric signatures, including character to frequency mapping, character to temporal mapping, and character to color mapping;
    evaluating a sequence of chords in the autometric signatures to determine a distinct audio signature;
    visualizing the autometric signatures, including audio signature analysis and signal data visualization;
    visualizing the autometric signatures;
    determining known autometric signatures;
    detecting image similarities of the signatures with deep learning image comparison; and
    sending the autometric signatures to the motor vehicle, wherein the motor vehicle communicates with an information exchange infrastructure and a mobile device listens to the autometric signals and communicates with the information exchange infrastructure.

* * * * *